United States Patent
Wang et al.

(10) Patent No.: US 10,663,612 B2
(45) Date of Patent: May 26, 2020

(54) REAL-TIME DETERMINATION OF MUD SLOWNESS, FORMATION TYPE, AND MONOPOLE SLOWNESS PICKS IN DOWNHOLE APPLICATIONS

(71) Applicant: Halliburton Energy Services, Inc., Houston, TX (US)

(72) Inventors: Ruijia Wang, Singapore (SG); Chung Chang, Houston, TX (US); Baichun Sun, Perth (AU)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/565,725

(22) PCT Filed: Nov. 3, 2016

(86) PCT No.: PCT/US2016/060367
§ 371 (c)(1),
(2) Date: Oct. 11, 2017

(87) PCT Pub. No.: WO2018/084847
PCT Pub. Date: May 11, 2018

(65) Prior Publication Data
US 2019/0257971 A1    Aug. 22, 2019

(51) Int. Cl.
*G06F 11/30* (2006.01)
*G01V 1/50* (2006.01)
(Continued)

(52) U.S. Cl.
CPC ................ *G01V 1/50* (2013.01); *E21B 47/00* (2013.01); *G01V 1/48* (2013.01); *G01V 1/52* (2013.01);
(Continued)

(58) Field of Classification Search
CPC ....................................................... G01V 1/50
See application file for complete search history.

(56) References Cited

U.S. PATENT DOCUMENTS

| 4,698,792 | A | 10/1987 | Kurkjian et al. |
| 8,009,509 | B2 | 8/2011 | Valero et al. |

(Continued)

FOREIGN PATENT DOCUMENTS

| WO | WO 2000/042449 A1 | 7/2000 |
| WO | WO 2014/070182 A1 | 5/2014 |

OTHER PUBLICATIONS

International Search Report and The Written Opinion of the International Search Authority, or the Declaration, dated Jul. 1, 2017, PCT/US2016/060367, 17 pages, ISA/KR.
(Continued)

*Primary Examiner* — Phuong Huynh
(74) *Attorney, Agent, or Firm* — Haynes and Boone, LLP

(57) ABSTRACT

An acoustic logging system identifies hydrocarbon formation types by a real-time model-constrained mud wave slowness determination method using borehole guided waves. The system also combines data processing from different acoustic waveform processing techniques using an information sharing procedure, for example, using monopole source data and dipole source data, to further improve the processing results and to achieve more stable and reliable real-time shear slowness answers.

18 Claims, 11 Drawing Sheets

(51) Int. Cl.
*G01V 1/52* (2006.01)
*G01V 1/48* (2006.01)
*E21B 47/00* (2012.01)

(52) U.S. Cl.
CPC .. *G01V 2210/1299* (2013.01); *G01V 2210/47* (2013.01); *G01V 2210/6222* (2013.01)

(56) References Cited

U.S. PATENT DOCUMENTS

| | | |
|---|---|---|
| 2002/0116128 A1* | 8/2002 | Sinha .................. G01V 1/48 702/6 |
| 2005/0190651 A1 | 9/2005 | Plona et al. |
| 2015/0049585 A1 | 2/2015 | Collins et al. |
| 2015/0123665 A1 | 5/2015 | Mukhopadhyay et al. |

OTHER PUBLICATIONS

Norris, et al., "The Speed of a Wave Along a Fluid/Solid Interface in the Presence of Anisotropy and Prestress," The Journal of the Acoustical Society of America, Issue 98, vol. 2, 1995, pp. 1147-1154.

* cited by examiner

US 10,663,612 B2

REAL-TIME DETERMINATION OF MUD SLOWNESS, FORMATION TYPE, AND MONOPOLE SLOWNESS PICKS IN DOWNHOLE APPLICATIONS

PRIORITY

The present application is a U.S. National Stage patent application of International Patent Application No. PCT/US2016/060367, filed on Nov. 3, 2016, the benefit of which is claimed and the disclosure of which is incorporated herein by reference in its entirety.

FIELD OF THE DISCLOSURE

The present disclosure relates generally to downhole logging and, more specifically, to methods for determining real-time mud slowness and formation type, as well as the optimization of monopole refracted shear wave slowness picking.

BACKGROUND

The collection of information relating to downhole conditions, commonly referred to as "logging," can be performed by several methods including "logging while drilling" ("LWD") and wireline logging. Downhole acoustic logging tools are often utilized to acquire various characteristics of earth formations traversed by the borehole. In such systems, acoustic waveforms are generated using a transmitter, and the acoustic responses are received using one or more receiver arrays. The acquired data is then utilized to determine the slownesses (velocities) of the formation and the borehole fluid, which could be used to calculate characteristics such as porosity, Poisson's ratio, Young's modulus and bulk modulus of the formation or the borehole fluid. Those characteristics may be of use in well planning and cement or formation evaluation; for example, to direct perforation guns or assess wellbore stability.

Borehole waves generated by an impulse source consist of multiple complicated guided waves travelling along the borehole surrounded by rock. To extract slowness measurements from those mixed wave motions, such as compressional slowness ("DTC") and shear slowness ("DTS"), or shear slowness from low-frequency screw waves in LWD cases, a 2D coherence map is generally used for such purposes. However, the identification and correct picking of these target wave modes from the 2D map are challenging, as it is often necessary to deal with the a low signal-to-noise ratio ("SNR"), interferences of other wave modes, such as leaky-P wave, tool waves, Stoneley waves, road noises due to the tool movements, or aliases of these modes within the 2D coherence map. All of these reasons can contribute to a complicated borehole wave field, thus reducing the ability to make correct, simple and real-time automatic slowness picks.

Moreover, one of the primary challenges to acoustic data processing is the signal processor does not know whether the formation is hard or soft (i.e., formation type), as the borehole wave characteristics are quite different for these two types of formations. Generally, the system requires user input if shear waves exist. In real-time processing, the task becomes even more challenging as there is no human-computer interaction. Often, conventional processing of waveform data acquired with a single type of source (e.g., monopole source) is hard to distinguish if those waves after the refracted compressional waves are shear waves, mud waves, leaky-P waves, Stoneley waves or high-frequency pseudo-Rayleigh waves. Such multiple possibilities lead to the situation where the system cannot automatically pick and identify shear waves.

DESCRIPTION OF ILLUSTRATIVE EMBODIMENTS

Figure 1:
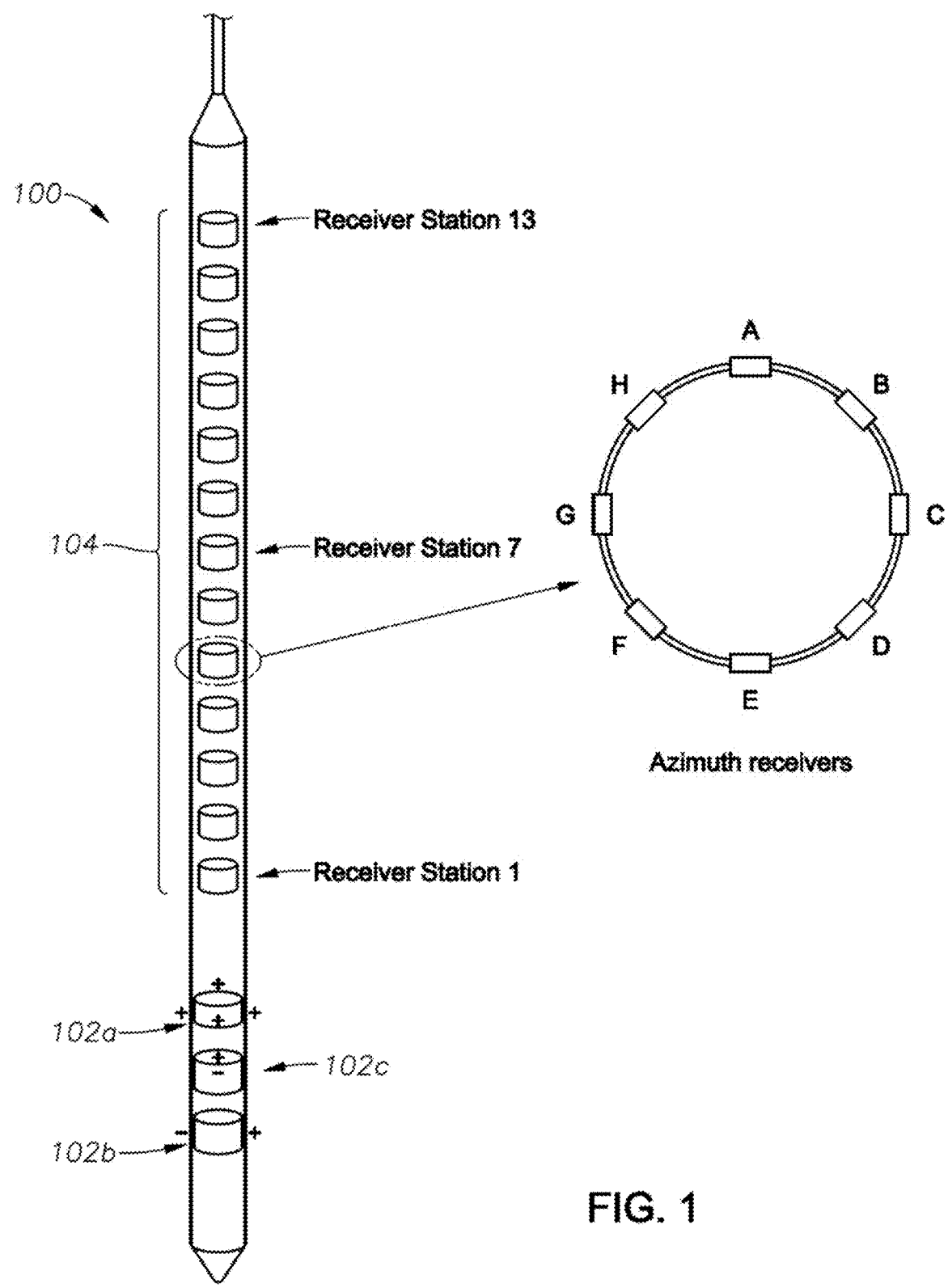
FIG. 1 illustrates an acoustic tool which may be used to perform certain illustrative methods of the present disclosure.

Illustrative embodiments and related methods of the present disclosure are described below as they might be employed in methods and systems for real-time determination of mud slowness and formation type, and to optimize slowness picking of acoustic waveforms. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and businessrelated constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the disclosure will become apparent from consideration of the following description and drawings.

As described herein, illustrative systems and methods of the present disclosure provide real-time mud slowness calculation and determination of formation elastic type, in addition to optimizing shear wave slowness pickings. As previously mentioned, one of the main challenges to acoustic data processing is the system does not know the formation type (i.e., hard or soft). As a result, the system has difficulty distinguishing whether the waveform data corresponds to shear waves, mud waves, Stoneley waves, etc.

To address this deficiency, embodiments of the present disclosure narrow down the waveform possibilities by first identifying the formation type, from which the system then determines the mode types which may exist in the full wave train. To overcome the challenges of conventional approaches, the present disclosure provides a workflow that automatically identifies the formation types by a real-time model-constrained mud wave slowness determination method using borehole guided waves. This disclosure also provides logics to combine data processing from different acoustic waveform processing techniques using an information sharing procedure, for example, by using monopole source data and dipole source data, to further improve the processing results and to achieve more stable and reliable real-time shear slowness answers.

In a generalized method of the present disclosure, a logging tool is deployed downhole along a borehole and acoustic waveforms are acquired. Using the acquired waveforms, the formation type is determined to be a hard or soft formation. Hard formations refer to formation shear slowness lower than the borehole mud compressional wave slowness. Soft formations refer to formation shear slowness higher than the borehole mud compressional wave slowness. Once the formation type is known, the system then identifies slowness picks, which are then used to determine various characteristics of the formation. These and other advantages will be apparent to those ordinarily skilled in the art having the benefit of this disclosure.

Acoustic logging has become a basic logging service for borehole geophysical exploration as it provides valuable information to geoscientist and petrophysicist. Acoustic logging tools have advanced from the single-transmitter and double-receiver tools to the modern array sonic tools with different types of sources and receivers. The measurement precision, range, and quality have been significantly increased, and application scope has also been expanded.

There are several acoustic guided waves that exist in a fluid-filled borehole. For example, a monopole source can excite a borehole refracted P-wave, a borehole refracted S-wave, pseudo-Rayleigh waves of different orders and Stoneley waves if it is in a fast formation borehole. A monopole source may generate a refracted P-wave, a leaky-P-wave and Stoneley waves in a slow formation borehole. A dipole source may excite a borehole refracted P-wave, a borehole refracted S-wave, and flexural waves of different orders if it is in a fast formation borehole. These waves propagate along the borehole axis and are all borehole guided waves. Among all the guided waves, borehole refracted P- and S-waves propagate along the borehole axis with the speed of formation body waves, and therefore these two types of waves are used to extract formation compressional and shear slowness Thus, conventional acoustic logging techniques face large challenges due to the complicated downhole environments. For example, there are always multiple modes in the monopole full wave trains, including refracted compressional waves, refracted shear waves, Stoneley waves, leaky-P waves, pseudo-Rayleigh waves and so on. If the tool is eccentric in the well bore, there may be additional borehole guided waves of higher azimuthal orders. The existences of these modes depend upon the formation elastic types. In other words, in different types of formations, different modes may exist. Specifically, in the case of soft formations where the formation shear slowness is larger than the mud wave slowness, refracted shear and pseudo-Rayleigh waves are not presented while leaky-P waves are generally well excited when waveforms are recorded with a monopole source and receivers. In such formations, one cannot directly extract shear wave slowness from the wave trains. For this reason, the shear slowness picking from monopole waveforms is challenging if one does not know the formation types and, thus, does not know if shear waves are present.

Conventional processing always treats the borehole refracted wave measurements and the guided wave measurements as two different types of independent measurements. So, the two separate measurement processes do not exchange information that would impose constrains to each other. For example, conventional approaches may process monopole data independently to get refracted compressional and shear slowness, while separately processing dipole waveform data to obtain shear slowness from the low-frequency flexural asymptotes. The shear slowness from two different types of sources might be adopted together to confirm the answers.

Therefore, conventional independent processing provides two different answers that could be used to validate each other. However, such independent processing might lead to the situation where the data is not fully utilized. For example, DTC may be easily obtained in monopole processing, but not in dipole processing; however, DTC is very useful in determining the slowness-frequency processing range for dipole flexural dispersion analysis. Mud slowness is another important parameter in helping to determine the limit of shear wave slowness excited by a monopole source. Nevertheless, without a separate measurement the mud slowness can only be estimated from guide wave processing.

In view of these shortcomings in conventional techniques, the present disclosure also provides methods to combine the monopole and dipole data, using both the refracted wave processing and dispersion processing, which is beneficial for advanced sonic logging data processing. To combine both refracted wave processing and dispersion processing, the present disclosure provides a well-designed work flow, which ensures the slowness answers from monopole and dipole sources remain separate solutions, and may be used to validate one another. In addition, the present disclosure provides workflows which increase the reliability of processing by combining the two sources.

To achieve these benefits, certain illustrative methods described herein exchange processing results between refracted wave processing and guided wave processing in order to enhance the answering product while also keeping the two processes as independent solutions of the acoustic logging. To overcome the challenge of identifying formation types, the present disclosure provides methods to calculate the real-time mud wave slowness and, furthermore, the formation type may be identified by comparing mud slowness value and shear slowness estimates from borehole guided wave processing. Next, the formation type and mud wave slowness are communicated to the monopole processing module to optimize the refracted shear wave slowness picking.

In view of the foregoing, FIG. 1 illustrates an acoustic tool which may be used to perform certain illustrative methods of the present disclosure. Generally speaking, acoustic logging tool 100 includes multiple transmitters 102 to excite different borehole modes and a receiver array section 104 that captures borehole acoustic waves of different azimuthal orders. Transmitters 102 include a monopole source 102a, Y dipole source 102b, and an X dipole source 102c. Such an acoustic system makes tool 100 capable of obtaining compressional and shear slowness in any types of borehole and formations. Acoustic tool 100 may be, for example, Halliburton Energy Services, Inc.'s Array Sonic Tool ("AST") and Xaminer® Sonic tool. Also note in certain illustrative embodiments tool 100 may include multi-receiver stations 1 . . . N where each station includes several azimuthal receivers A-H as shown in FIG. 1. Ultimately, the methods described herein may be applied in any variety of azimuthal receiver arrays or other receiver configurations. In addition, tool 100 may also include cross dipole sources, specifically X source or Y source, so that the methods described herein may be applied either in X dipole data or Y dipole data.

Figure 2A:
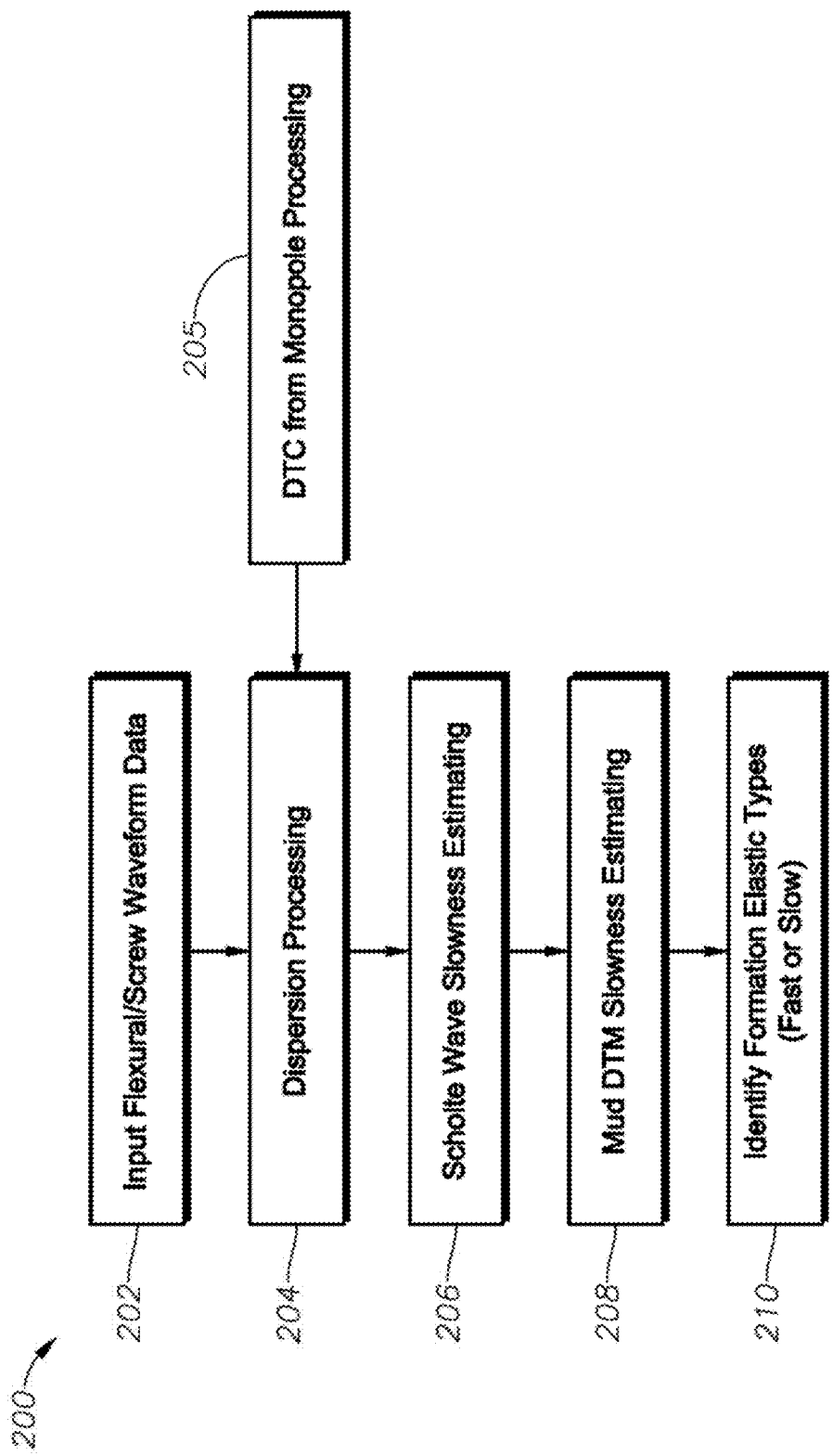
FIG. 2A is a flow chart of an acoustic logging method to determine mud wave slowness and to identify the formation elastic type by performing dispersion processing of the borehole guided waves, according to certain illustrative methods of the present disclosure.

FIG. 2A is a flow chart of an acoustic logging method 200 to determine mud wave slowness and to identify the formation elastic type by performing dispersion processing of the borehole guided waves, according to certain illustrative methods of the present disclosure. After the acoustic logging tool has been deployed along the borehole and acoustic impulses fired, at block 202, the guided waves (e.g., flexural/screw waveform data) are acquired and input into the system for processing. At block 204, the theoretical modal dispersions are extracted from the waveform data whereby the high-frequency slowness asymptote of the data are estimated using a full-frequency dispersion inversion. To achieve this, a variety of dispersion techniques, such as, for example, borehole dispersive wave processing with automatic dispersion matching, might be applied to the waveform data to extract a modeling-constrained full dispersion curve from the array waveform.

Figure 2B:
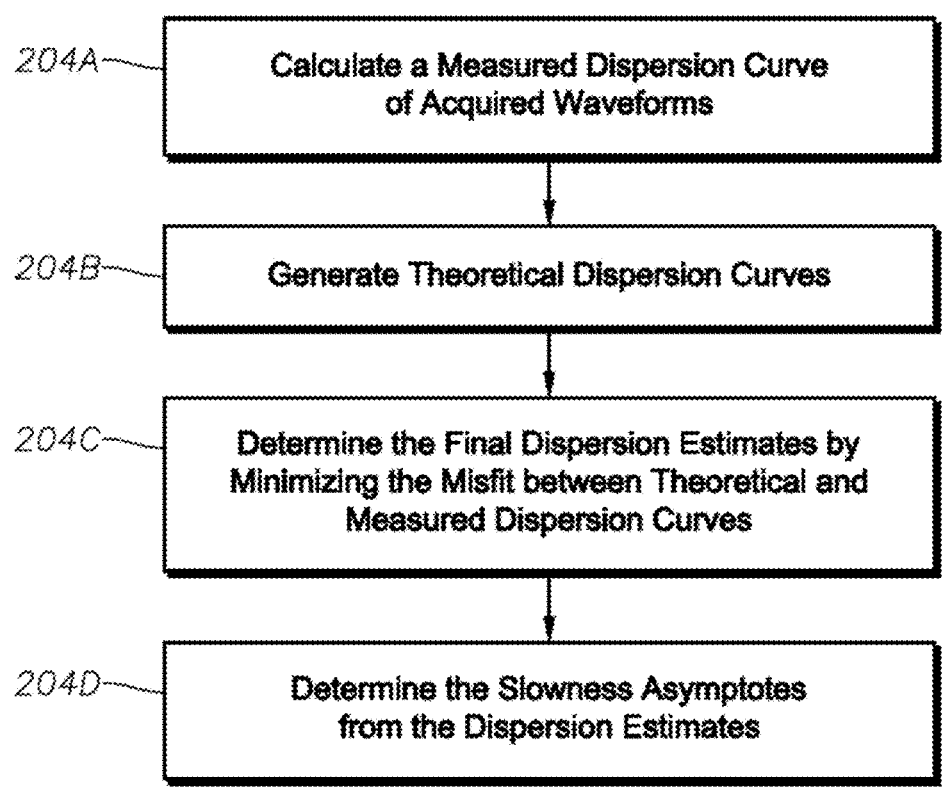
FIG. 2B is a flow chart of a method for dispersion processing at block 204 of FIG. 2A, according to certain illustrative methods of the present disclosure.

To perform the processing at block 204, various different illustrative methods may be applied. FIG. 2B is a flow chart of a method for dispersion processing at block 204, according to certain illustrative methods of the present disclosure. At block 204A, the measured dispersion curves are calculated from the acquired waveforms using any desired dispersion extracting method. At block 204B, the true or simplified theoretical dispersion curves are computed by forward modeling. In some illustrative methods, these theoretical dispersion curves may be pre-calculated and saved to memory, and then recalled when needed in the processing. Next, at block 204C, inversion processing is performed to minimize the misfit between theoretical and measured dispersion curves, and thus the final dispersions are estimated from the theoretical dispersion curves that best fit the measured dispersions. At block 204D, the slowness asymptotes of the dispersion estimates are determined, wherein the low-frequency asymptotes often denote shear wave slowness for some guided waves and the high-frequency asymptotes represent Scholte wave slowness.

Referring back to FIG. 2A, as will be discussed in more detail below, in certain alternative embodiments, DTC from monopole processing may be applied to the dispersion processing of the guided waveforms at block 205 to thereby constrain the determination of formation type. At block 206, the Scholte wave slowness is then extracted from the high-frequency slowness asymptotes of estimated flexural/screw dispersion curves using:

$$D(f_\infty)=bD(DTS,1,1,a^*f_\infty)+(1-b)DTS, \quad \text{Eq. (1)},$$

where DTS represents shear wave slowness; $D(f_\infty)$ represents high-frequency slowness asymptotes; a and b denote optimal parameters for the simplified model; $s_{shear}$ represents estimated shear slowness from dispersion processing; and $D(s_{shear},1,1,a^*f_\infty)$ represents fundamental flexural dispersions that are built with several basic model parameters. This illustrative dispersion model introduces two stretching parameters a and b to compensate for the influence of the unknown parameters, such as anisotropy or invasion parameters. Parameter a is adopted to compensate the changes in the frequency axis due to the influence from other parameters, while parameter b is utilized to compensate for the changes in the slowness axis. A combination of a and b describes the influences of all the other parameters on the dispersion responses. The parameter a and b compensate for all errors that are generated by unknown mud/formation factors, and the variables are inverted depth by depth in the processing.

Still referring to method 200, the mud wave slowness ("DTM") is calculated at block 208 using the Scholte wave slowness according to the following analytical equation:

$$DTM = \left(DT_{Sch}^2 - \left(\frac{-\rho_{mud}\alpha DTS^4}{\rho_{formation}((DT_{Sch}^2+\beta^2)^2 - 4\alpha\beta DT_{Sch}^2)}\right)^2\right)^{\frac{1}{2}} \quad \text{Eq. (2)}$$

where, $$\alpha=(DT_{Sch}^2-DTC^2) \quad \text{Eq(3), and}$$

$$\beta=(DT_{Sch}^2-DTS^2) \quad \text{Eq(4),}$$

where DTM represents mud slowness; DTC and DTS denote formation compressional and shear wave slowness, respectively; $DT_{Sch}$ represents Scholte wave slowness; and $\rho_{mud}$ and $\rho_{formation}$ represent mud and formation density, respectively. In real-time processing, mud density is a fixed value that is determined from the mud type and formula, as well as downhole temperature and pressure for a specific well. The formation density is a log curve that is obtained from previous density logging. If the density log does not exist, in certain methods, some empirical equations may be used which connect formation density to some known logs/parameters, for example DTC and DTS.

Once the Scholte wave slowness is determined by the high-frequency slowness asymptote of flexural/screw wave dispersions at block 208, the mud slowness is then determined using Equation 2 above. In certain alternative methods, note the Scholte wave slowness and mud wave slowness may be determined using high-frequency slowness asymptote of Stoneley wave dispersions.

After mud slowness is estimated at block 208, the formation elastic type is determined. This determination may be made in a variety of ways, including, for example, by comparing the mud wave slowness and the estimate formation shear slowness from borehole guided waves. For example, if the formation shear slowness is higher than the mud wave slowness, then the formation is soft; otherwise, the formation is hard. As previously discussed, herein, a hard formation, also called fast formation, refers to formation shear slowness is lower than mud wave slowness while a soft formation, also called slow formation, refers to formation shear slowness higher than mud wave slowness. In certain illustrative methods, this additional information may be communicated to the monopole processing module to determine if the refracted shear waves or other waves exist in the waveform or not. Thereafter, as will be discussed in more detail below, the formation type is applied to identify slowness picks used to identify a variety of formation characteristics, such as, for example, porosity, Poisson's ratio, Young's modulus and bulk modulus.

Figure 3:
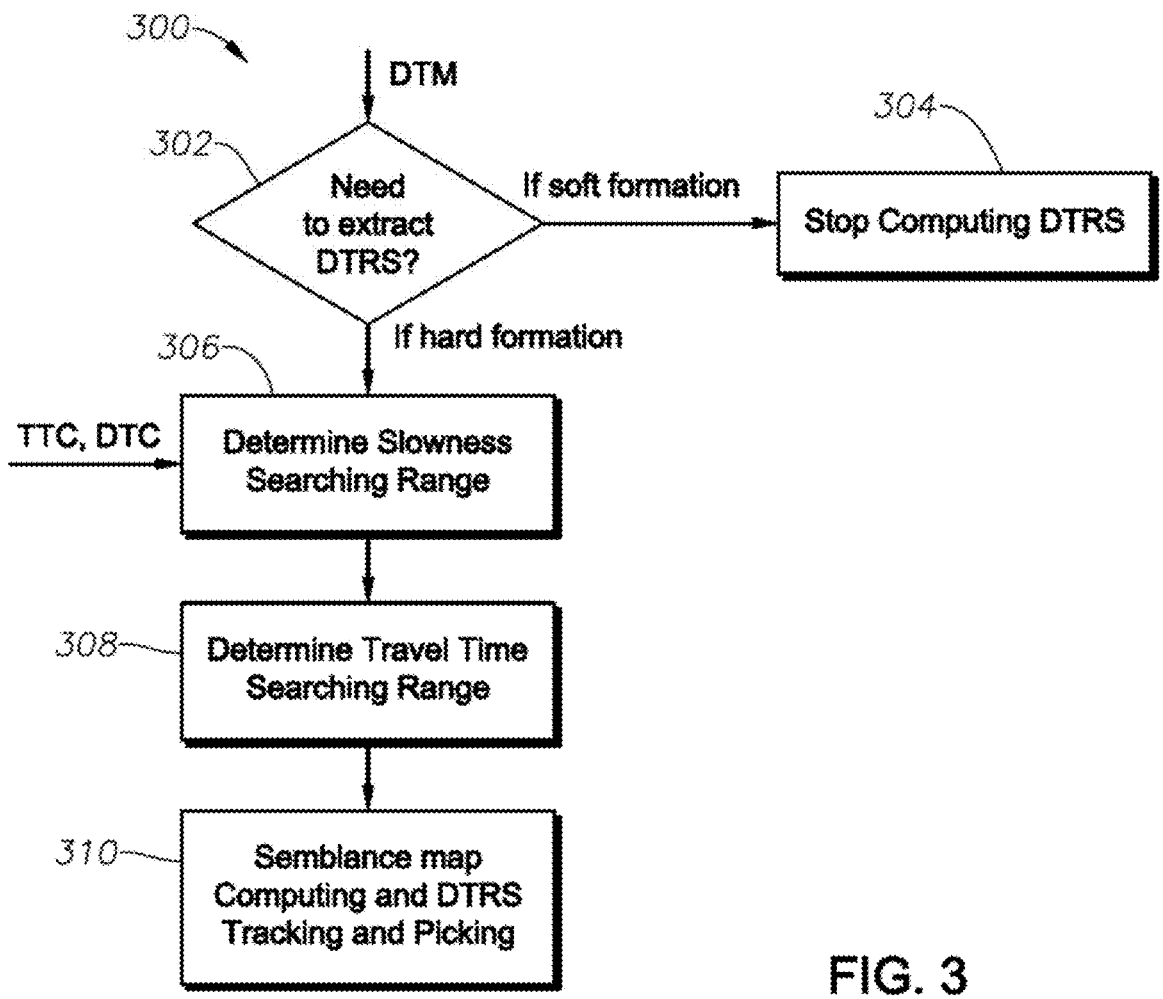
FIG. 3 is a flow chart of a method which applies the mud wave slowness and formation types to constrain refracted shear slowness picking, according to certain illustrative methods of the present disclosure.

In certain illustrative methods of the present disclosure, the determined DTM and formation types of method 200 may be applied in refracted wave data processing, which in general is the monopole refracted shear wave processing recognized by the industry (although other processing may be used). FIG. 3 is a flow chart of a method 300 which applies the DTM and formation types to constrain refracted shear slowness ("DTRS") picking. At block 302, from the formation type (block 210), the system or user determines if there is a need for extracting DTRS. For example, if it is a soft formation, the DTRS computing block may be skipped (block 304) because under such a case, the monopole source cannot excite refracted shear waves that could be detected. If a hard formation, the method proceeds to block 306 where DTRS extraction begins.

At block 306, the travel time of compressional waves ("TTC") and compressional wave slowness ("DTC") from monopole compressional wave processing and mud wave slowness ("DTM") from guided wave processing (block 208) are combined to determine the searching range of the shear wave slowness. Following is the physical rule if DTRS exists, the DTS is always larger than DTC and smaller than DTM:

$$s_{min} = DTC * 1.35 \qquad \text{Eq. (5), and}$$

$$s_{max} = DTM \qquad \text{Eq. (6).}$$

where $s_{min}$ is minimum limit of DTRS slowness search range and $s_{max}$ is maximum limit of DTRS slowness search range. Additionally, because the DTM does not change quickly in the well, DTM can be assumed to be constant in the section of the whole acoustic system (transmitter to receiver). Thus, in certain illustrative methods, DTM is used to determine the upper limit of the shear wave travel time ("$t_{max}$"). The TTC is used to determine the lower limit of the shear wave travel time ("$t_{min}$") as:

$$t_{min} = (TTC - t_{comp}) * 1.4 + t_{comp}, \qquad \text{Eq. (7)}$$

and $$t_{max} = (TTC - t_{comp}) * \frac{DTM}{DTC} + t_{comp}, \qquad \text{Eq. (8)}$$

where $t_{comp}$ represents a time compensation related to borehole radius and source duration. Thus, the travel time searching range is determined at block 308. In an alternative illustrative method, $t_{max}$ may be computed using an integrated approach:

$$t_{max} = \int_{z_{Source}}^{z_{Receiver}} DTM(z)dz + DTM(z_{Source})(r(z_{Source}) - r_{Source}) + DTM(z_{Receiver})(r(z_{Receiver}) - r_{Receiver}), \qquad \text{Eq. (9)}$$

where r represents radial position of the source or the receiver; z represents the axial position of the source or the receiver along the borehole direction. After the slowness and travel time range are determined by the above equations in blocks 306 and 308, the system then computes the semblance map and perform DTRS slowness pickings by tracking the peaks in that map, at block 310.

Another advantage of the present disclosure is the capability to provide processing results exchange between the refracted wave processing and guided wave processing modules. Generally speaking, refracted wave processing refers to the various types of monopole processing which may be applied, while the guided wave processing refers to, for example, flexural or screw wave processing. Here, the processing results exchange between the refracted wave processing and guided wave processing modules further constrains the inversion results and improves the quality, as well as the accuracy of the two processing.

Figure 4:
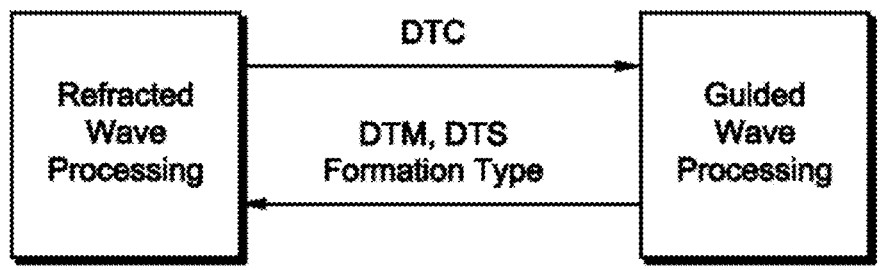
FIG. 4 is a diagrammatical representation of a monopole processing module (refracted wave processing) and dipole processing module (guided wave processing)

FIG. 4 is a diagrammatical representation of a monopole processing module (refracted wave processing) and dipole processing module (guided wave processing). The modules will form part of the computer processing unit used to perform the illustrative method, as will be understood by those ordinarily skilled in the art having the benefit of this disclosure. For example, as shown in FIG. 4, since DTC can be easily extracted by the monopole processing, DTC may be communicated from monopole results to the guide wave processing module to thereby constrain the determination of slowness and frequency range for the estimation of flexural/screw dispersions (e.g., block 204 of FIG. 2A). This constrains the processing by restricting the slowness/frequency search range for flexural/screw wave dispersions using empirical equations to generate forward modeling in order to connect DTC knowledge to the flexural dispersion response.

Additionally, the DTM, DTS and formation type that are determined by the guide wave dispersion processing module (FIG. 2A, e.g.) may be sent to the refracted wave processing module, thereby constraining the determination of the slowness and travel time searching range for DTRS (e.g., blocks 306 & 308). The slowness and travel time window for DTRS will constrain the picking within a reasonable range because in the projected search range for DTRS, the shear wave arrivals dominate the waveform. As a result, the DTRS slowness estimation will be enhanced. Note also that FIG. 4 only shows one example of the results exchange of monopole and dipole processing. In alternate methods, the exchange results could be used to identify other types of waves, for example Stoneley wave and Pseudo-Rayleigh wave.

Figure 5:
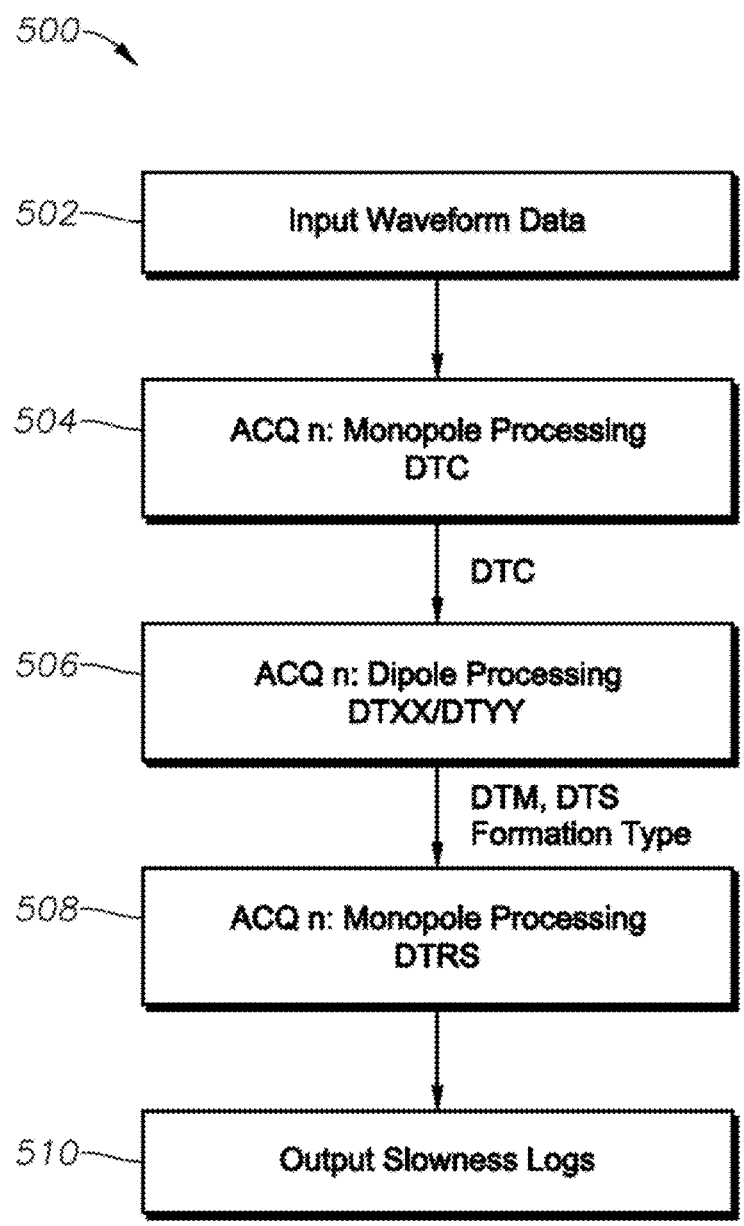
FIG. 5 is a flow chart of a method to combine the processing of monopole and dipole data through result exchanging, according to certain illustrative methods of the present disclosure.

FIG. 5 is a flow chart of a method 500 to combine the processing of monopole and dipole data through result exchanging, according to certain illustrative methods of the present disclosure. In method 500, after the waveform data is imported at block 502, during a first waveform acquisition ("ACQ n"), monopole processing for DTC picking is performed at block 504. At block 506, the DTC answer is transmitted to the dipole module for determining slowness/frequency or slowness/time range of DTXX and DTYY. Here, DTXX represents the shear slowness estimated from the waveform data excited by the X dipole source and captured by X dipole receiver array, and DTYY represents the shear slowness estimated from the waveform data excited by Y dipole source and captured by Y dipole receiver array. Next, at block 508, the DTM, DTXX or DTYY and formation type for the first waveform acquisition are transmitted back to the monopole module to determine the allowable slowness/travel time range of monopole refracted shear waves. At block 510, the monopole/dipole slowness logs are output. Note that in the method 500, certain illustrative methods may require monopole processing to be performed twice in order to pick DTC and DTRS separately.

Figure 6:
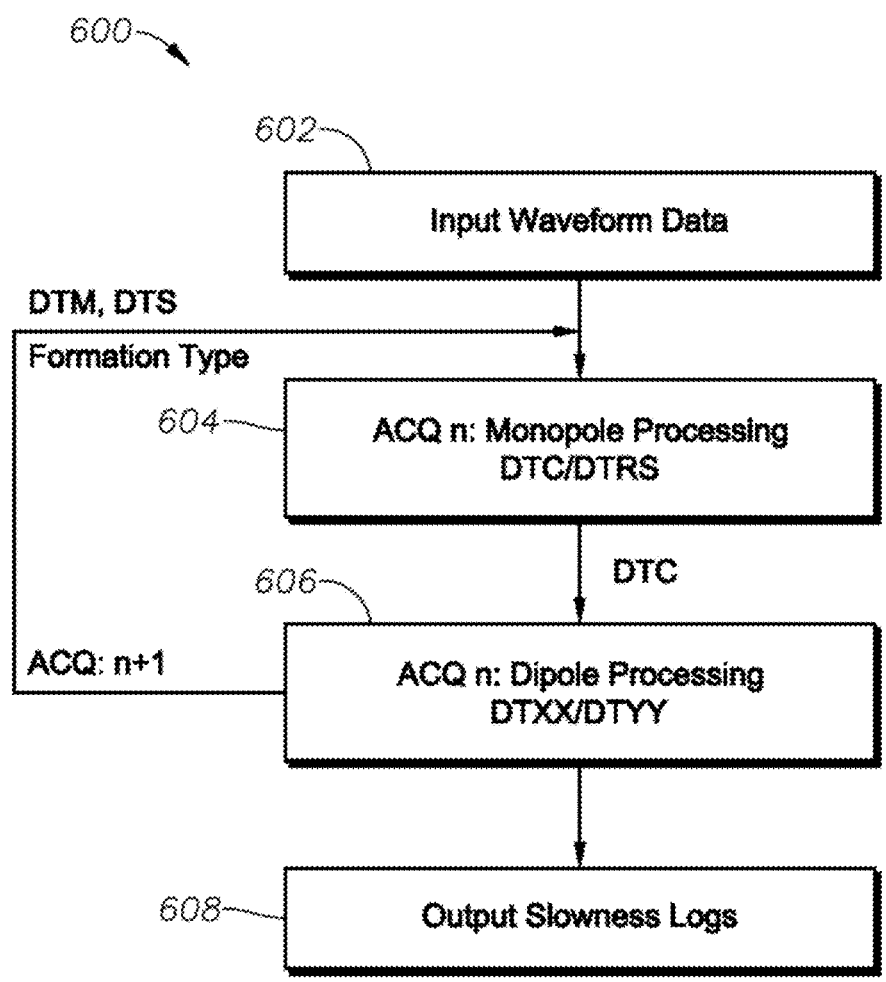
FIG. 6 is a flow chart for a method to combine the processing of monopole and dipole data through result exchanging for different waveform acquisitions, according to certain illustrative methods of the present disclosure.

FIG. 6 is a flow chart for a method 600 to combine the processing of monopole and dipole data through result exchanging for different waveform acquisitions, according to certain illustrative methods of the present disclosure. Here, as in method 500, data is exchanged between the refracted wave processing module and the guided wave processing module. To avoid processing monopole data twice, based on the fact that the DTM and formation type do not change rapidly via depth since the length of the receiver array is much larger than the distance between two adjacent shots, the system transmits the DTM, formation type, and DTS to the monopole processing module of the next waveform acquisition. The waveform acquisitions may be distinguished by borehole depth or acquisition time. Method 600 uses the results of monopole processing and dipole processing to constrain each other, thereby resulting in a more reliable real-time/post processing compressional/shear/mud slowness.

In method 600, after the waveform data is imported at block 602, during a first waveform acquisition ("ACQ n"), monopole processing for DTC picking is performed at block 604. At block 606, the DTC answer is transmitted to the dipole module for determining slowness/frequency or slowness/time range of DTXX and DTYY. Here, DTXX represents the shear slowness estimated from the waveform data excited by the X dipole source and captured by X dipole receiver array, and DTYY represents the shear slowness estimated from the waveform data excited by Y dipole source and captured by Y dipole receiver array. Next, the DTM, DTXX or DTYY and formation type for the first waveform acquisition are transmitted back to the monopole module to determine the allowable slowness/travel time range of monopole refracted shear waves of a second waveform acquisition ("ACQ: n+1"), where this process iteratively repeats itself. Also, at block 608, all the results from dipole/monopole processing are output.

Figure 7:
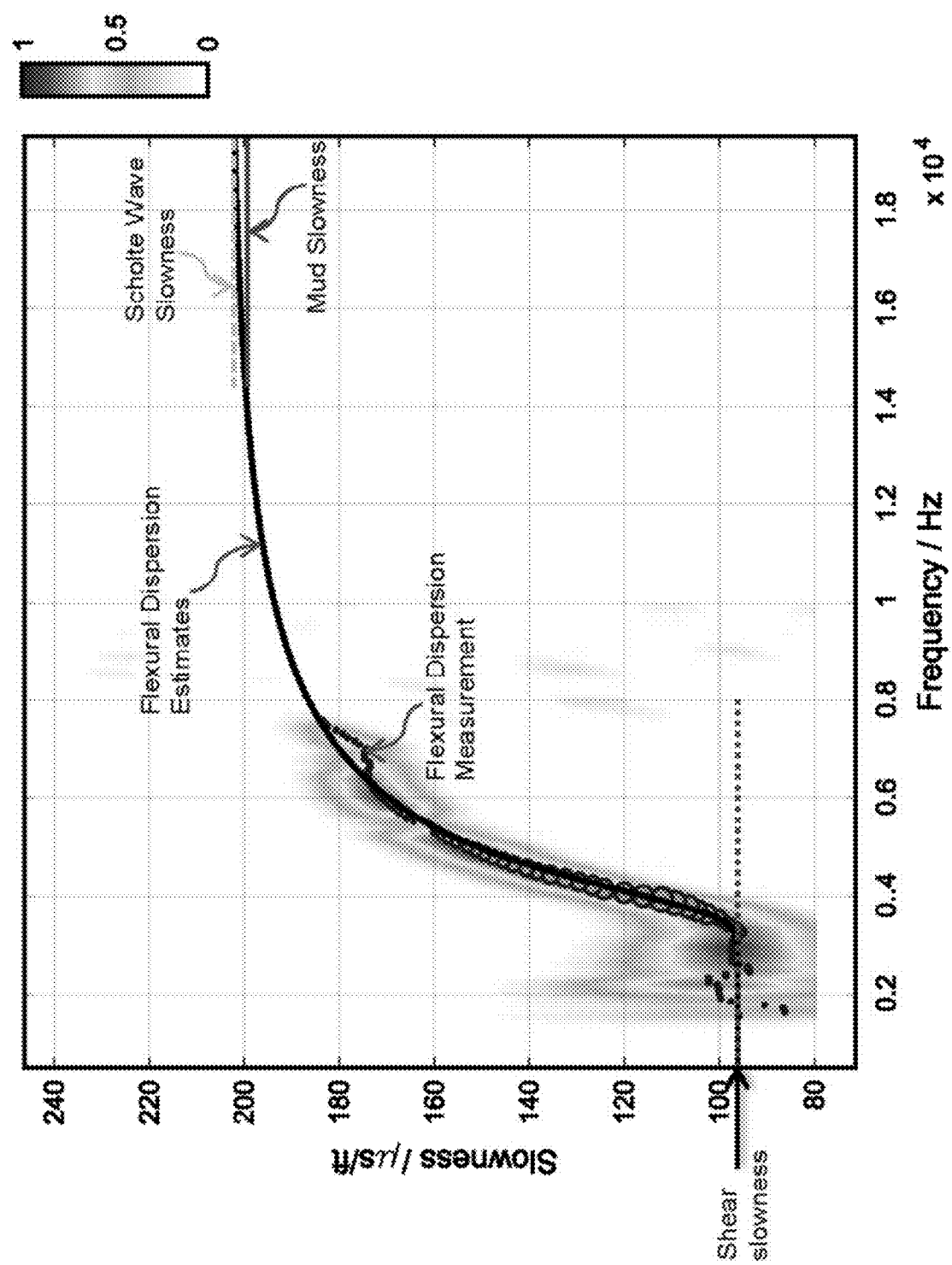
FIG. 7 is a graph showing an example of simultaneous estimation of shear slowness, Scholte wave slowness, and mud slowness from borehole flexural waves generated by a dipole source, according to certain illustrative methods of the present disclosure.

FIG. 7 is a graph showing an example of simultaneous estimation of shear slowness, Scholte wave slowness, and mud slowness from borehole flexural waves generated by a dipole source, according to certain illustrative methods of the present disclosure. The DTC, which is determined using monopole processing, serves as an input parameter to the dipole processing module to help prevent the selection of P modes or the leaky-P modes during dispersion picking. As shown in FIG. 7, the semblance map is calculated by a differential phase frequency semblance method, and the flexural dispersion estimation is obtained by the automatic dispersion match method. The shear slowness is determined by the low-frequency slowness asymptotes of the flexural dispersion curves, while the Scholte Wave slowness is obtained by the high-frequency slowness asymptotes. Then, the mud slowness value is determined by using Equation 2 of the Scholte wave slowness.

Figure 8:
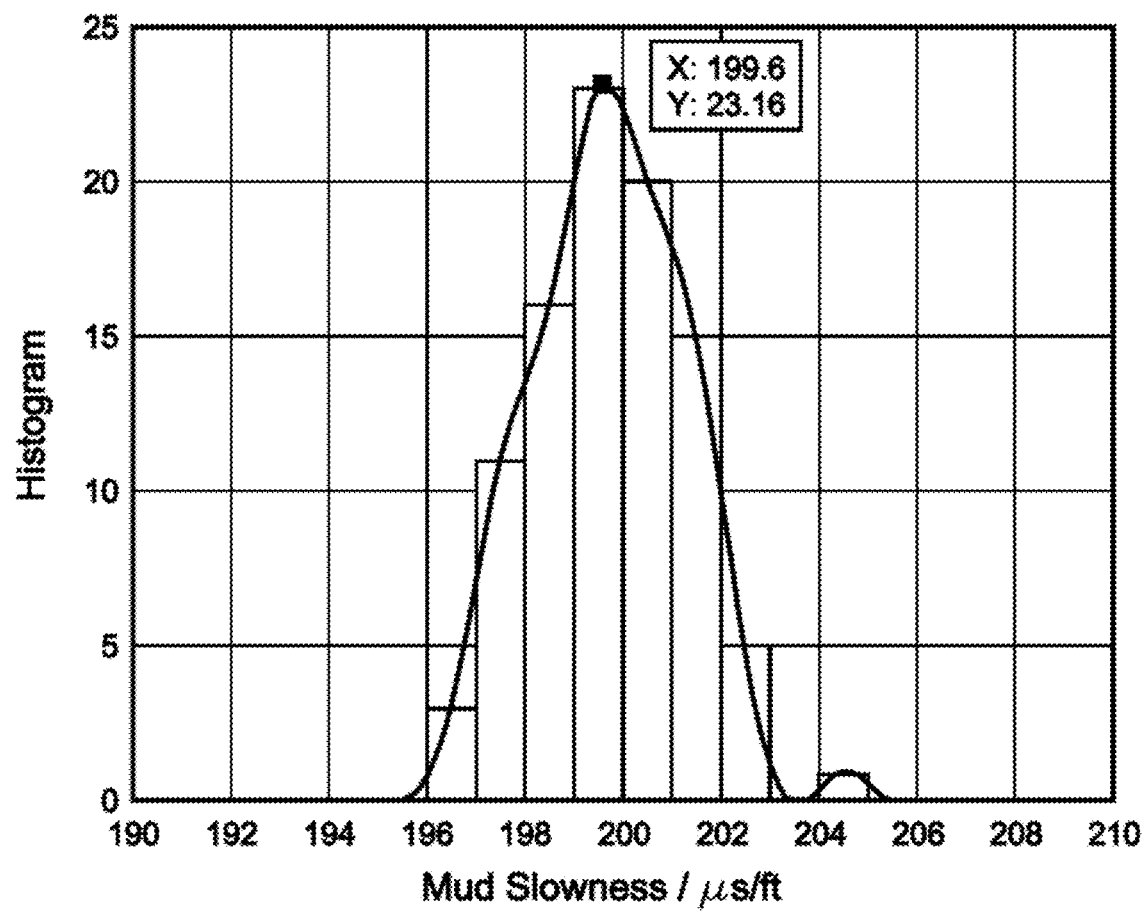
FIG. 8 is a histogram display of the mud slowness for a well zone generated according to certain illustrative methods of the present disclosure.

In certain situations, the mud slowness may not change rapidly in the borehole. Therefore, a multi-depth or a zoned analysis of the mud slowness may be performed during logging. Thus, in certain illustrative methods of the present disclosure, a histogram method is applied to analyze the mud slowness distribution for the target zone as shown in FIG. 8, which shows a histogram display of the mud slowness for a well zone. Here, the final mud slowness answer may be obtained by taking the average of all mud slowness values in that zone. Another illustrative method may select the peak value of the histogram as the final mud slowness answer. To gain a better precision, an interpolation procedure, such as "spline interpolation" for example, could be applied to the histogram. As shown in FIG. 8, the mud slowness value of 199.6 us/ft is derived from the histogram curve after the interpolation.

Figure 9:
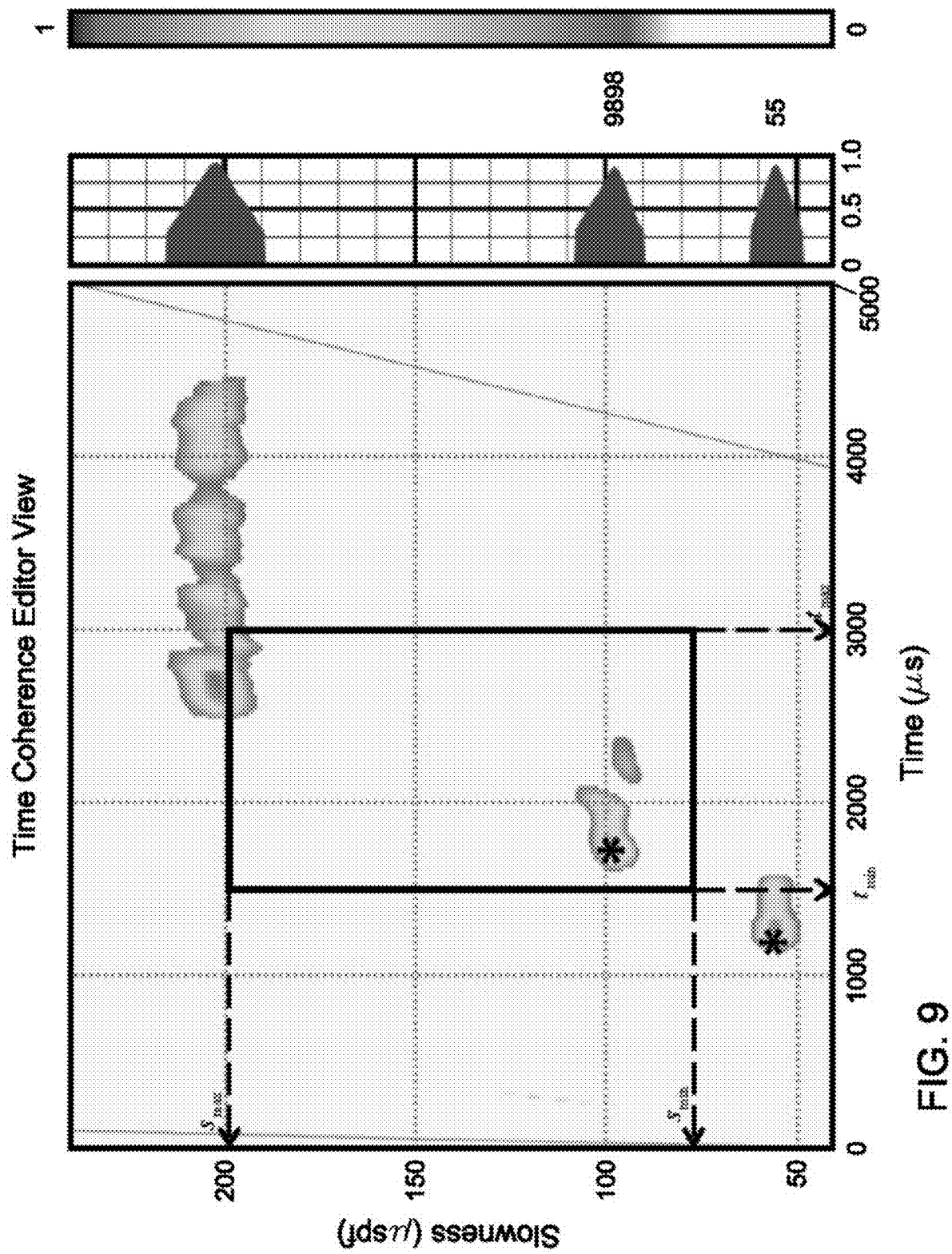
FIG. 9 shows an example of using mud wave slowness, DTC, travel time of compressional waves, and formation elastic type to constrain monopole refracted shear slowness picking, according to certain illustrative methods of the present disclosure.

FIG. 9 shows an example of using DTM, DTC, TTC and formation elastic type to constrain monopole DTRS picking, according to certain illustrative methods of the present disclosure. In this example, the picking range of $t_{min}$, $t_{max}$ and $s_{min}$, $s_{max}$ are determined by Equations 5-8 above. With additional constrains, the Stoneley peaks and P-wave peaks are excluded from the potential candidates, thus the shear wave peak becomes the only peak remaining in the window.

Figure 10A:
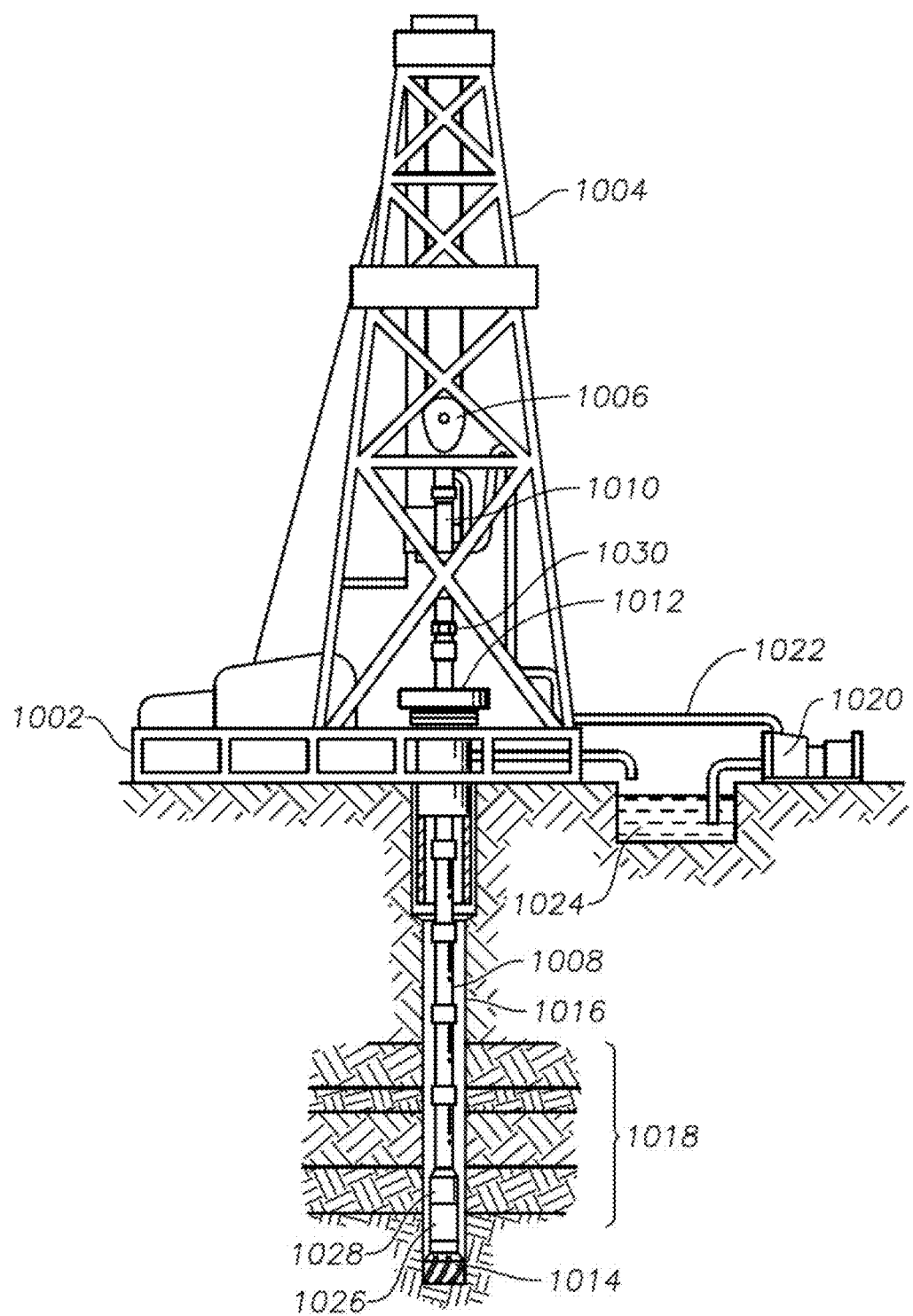
FIG. 10A illustrates an sonic/acoustic logging tool utilized in an LWD application, according to certain illustrative embodiments as described herein.

Illustrative methods of the present disclosure may be utilized in a variety of logging applications including, for example, LWD or MWD applications. FIG. 10A illustrates an sonic/acoustic logging tool utilized in an LWD application, that acquires acoustic waveforms and performs the slowness determinations using the illustrative methods described herein. The methods described herein may be performed by a system control center located on the logging tool or may be conducted by a processing unit at a remote location, such as, for example, the surface.

FIG. 10A illustrates a drilling platform 1002 equipped with a derrick 1004 that supports a hoist 1006 for raising and lowering a drill string 1008. Hoist 1006 suspends a top drive 1010 suitable for rotating drill string 1008 and lowering it through well head 1012. Connected to the lower end of drill string 1008 is a drill bit 1014. As drill bit 1014 rotates, it creates a wellbore 1016 that passes through various layers of a formation 1018. A pump 1020 circulates drilling fluid through a supply pipe 1022 to top drive 1010, down through the interior of drill string 1008, through orifices in drill bit 1014, back to the surface via the annulus around drill string 1008, and into a retention pit 1024. The drilling fluid transports cuttings from the borehole into pit 1024 and aids in maintaining the integrity of wellbore 1016. Various materials can be used for drilling fluid, including, but not limited to, a salt-water based conductive mud.

An acoustic logging tool 1026 is integrated into the bottom-hole assembly near bit 1014. In this illustrative embodiment, logging tool 1026 is an LWD sonic tool; however, in other illustrative embodiments, logging tool 1026 may be utilized in a wireline or tubing-conveyed logging application. If the logging tool is utilized in an application which did not rotate the downhole assembly, the logging tool may be equipped with azimuthally-positioned sensors which acquire the slowness measurement around the borehole. In certain other illustrative embodiments, acoustic logging tool 1026 may be adapted to perform logging operations in both open and cased hole environments.

In this example, acoustic logging tool 1026 will include multipole-capable transmitters and receiver arrays (not shown) which generate acoustic waves in geological formations and record their transmission. In certain embodiments, the transmitters may direct their energies in substantially opposite directions, while in others a single transmitter may be utilized and rotated accordingly. The frequency, magnitude, angle and time of fire of the transmitter energy may also be controlled, as desired. In other embodiments, the collected slowness measurements may be stored and processed by the tool itself, while in other embodiments the measurements may be communicated to remote processing circuitry in order to conduct the slowness processing.

Acoustic logging tool 1026 is utilized to acquire slowness measurement data at many azimuths. As such, certain embodiments may also include a directional sensor to determine the orientation of the tool. The illustrative methods described herein may be utilized in a variety of propagation modes, including, for example, borehole refracted compressional, shear, low frequency flexural, low frequency screw, quadrupole or Stoneley modes.

Still referring to FIG. 10A, as drill bit 1014 extends wellbore 1016 through formations 1018, logging tool 1026 collects slowness measurement signals relating to various formation properties/characteristics, as well as the tool orientation and various other drilling conditions. In certain embodiments, logging tool 1026 may take the form of a drill collar, i.e., a thick-walled tubular that provides weight and rigidity to aid the drilling process. A telemetry sub 1028 may be included to transfer slowness images and measurement data/signals to a surface receiver 1030 and to receive commands from the surface. In some embodiments, telemetry sub 1028 does not communicate with the surface, but rather stores slowness measurement data for later retrieval at the surface when the logging assembly is recovered.

In certain embodiments, acoustic logging tool 1026 includes a system control center ("SCC"), along with necessary processing/storage/communication circuitry, that is communicably coupled to one or more transmitters/receivers (not shown) utilized to acquire slowness measurement signals. In certain embodiments, once the acoustic waveforms are acquired, the system control center calibrates the signals, performs the slowness calculation methods described herein, and then communicates the data back uphole and/or to other assembly components via telemetry sub 1028. In an alternate embodiment, the system control center may be located at a remote location away from logging tool 1026, such as the surface or in a different borehole, and performs the statistical processing accordingly. These and other variations within the present disclosure will be readily apparent to those ordinarily skilled in the art having the benefit of this disclosure.

Figure 10B:
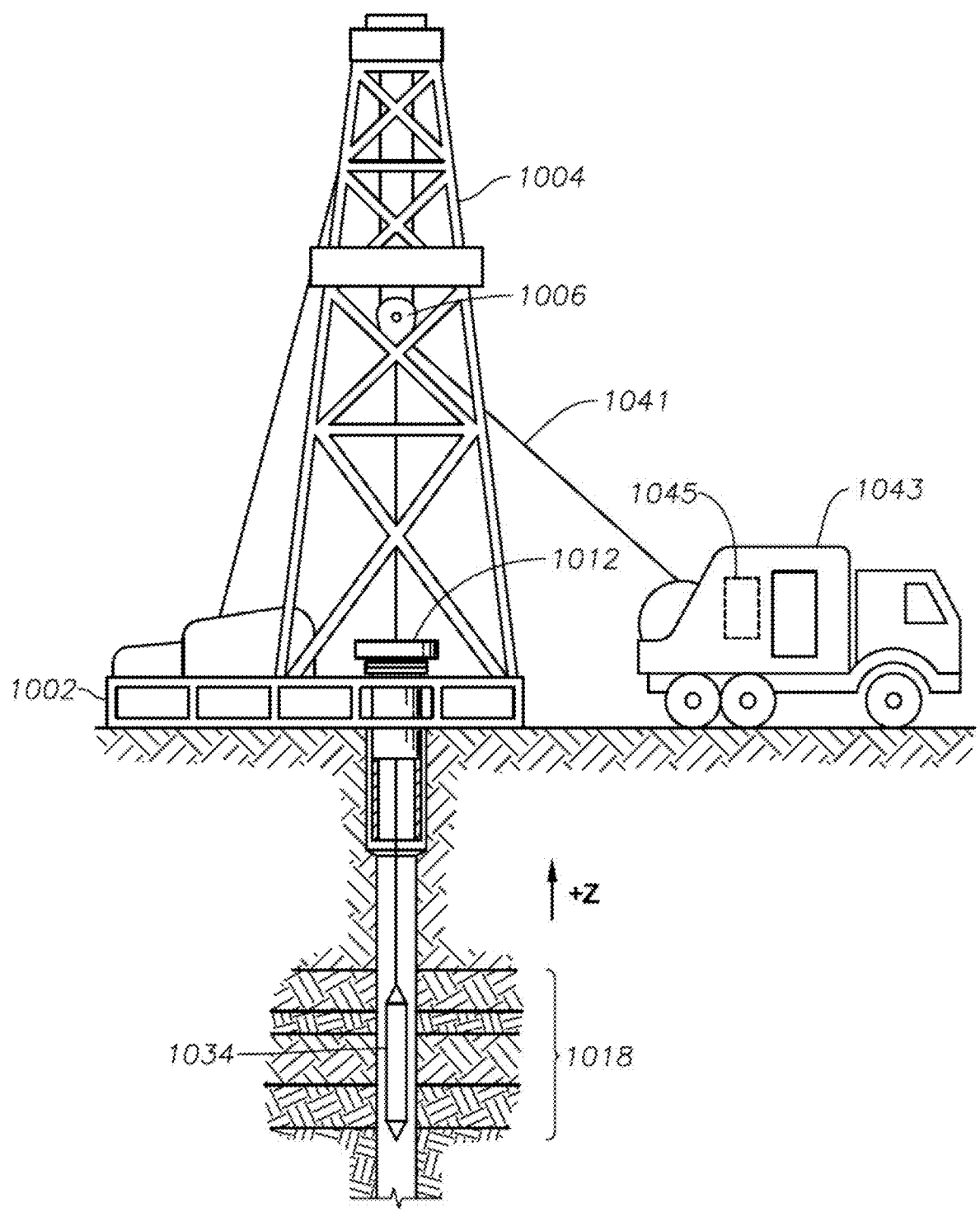
FIG. 10B illustrates an sonic/acoustic logging tool utilized in a wireline application according to certain illustrative embodiments as described herein.

FIG. 10B illustrates an alternative embodiment of the present disclosure whereby a wireline acoustic logging tool acquires and generates slowness signals. At various times during the drilling process, drill string 1008 may be removed from the borehole as shown in FIG. 10B. Once drill string 1008 has been removed, logging operations can be conducted using a wireline acoustic logging sonde 1034, i.e., an acoustic probe suspended by a cable 1041 having conductors for transporting power to the sonde and telemetry from the sonde to the surface. A wireline acoustic logging sonde 1034 may have pads and/or centralizing springs to maintain the tool near the axis of the borehole as the tool is pulled uphole. Acoustic logging sonde 1034 can include a variety of transmitters/receivers for measuring acoustic anisotropy. A logging facility 1043 collects measurements from logging sonde 1034, and includes a computer system 1045 for processing and storing the slowness measurements gathered by the sensors, as described herein.

In certain illustrative embodiments, the system control centers utilized by the acoustic logging tools described herein include at least one processor embodied within system control center and a non-transitory and computer-readable storage, all interconnected via a system bus. Software instructions executable by the processor for implementing the illustrative processing methods described herein in may be stored in local storage or some other computer-readable medium. It will also be recognized that the statistical processing software instructions may also be loaded into the storage from a CD-ROM or other appropriate storage media via wired or wireless methods.

Moreover, those ordinarily skilled in the art will appreciate that various aspects of the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and/or remote computer-storage media including memory storage devices. The present disclosure may therefore, be implemented in connection with various hardware, software or a combination thereof in a computer system or other processing system.

Accordingly, the illustrative methods described herein provide new methods to automatically determine mud wave slowness from the field data, as well as to implementing constrains for both monopole and dipole processing, thus improving the processing results. The disclosure further provides real-time mud slowness that assists picking the monopole DTRS and may be applied to advanced acoustic data processing. Moreover, the methods described herein may be applied in real-time or post processing or planning.

Embodiments and methods of the present disclosure described herein further relate to any one or more of the following paragraphs:

1. A downhole acoustic logging method, comprising acquiring acoustic waveforms of a borehole extending along a formation; determining a formation type of the formation using the acquired waveforms; identifying slowness picks using the formation type; and determining a characteristic of the formation using the slowness picks.

2. The method of paragraph 1, wherein mud wave slowness is used to determine the formation type.

3. The method of paragraphs 1 or 2, wherein determining the formation type comprises determining slowness asymptotes of the acquired waveforms; extracting Scholte wave slowness from the slowness asymptotes; calculating mud wave slowness using the Scholte wave slowness; and comparing the mud wave slowness and shear wave slowness to determine the formation type.

4. The method of any of paragraphs 1-3, wherein determining the slowness asymptotes comprises calculating a dispersion response of the acquired waveforms; determining full-frequency dispersion estimates by minimizing a misfit between theoretical dispersion curves and measured dispersion curves; and determining the slowness asymptotes from the full-frequency dispersion estimates.

5. The method of any of paragraphs 1-4, wherein identifying the slowness picks comprises determining a searching range of the shear wave slowness using the mud wave slowness, compressional wave travel time, and compressional wave slowness; determining a travel time of the shear wave slowness using the mud wave slowness and the compressional wave travel time; generating a semblance map using the searching range and travel time; and identifying the slowness picks of the semblance map.

6. The method of any of paragraphs 1-51, wherein the determination of formation type is performed in real-time.

7. The method of any of paragraphs 1-6, wherein monopole wave processing of a first waveform acquisition is applied to constrain the determination of the formation type.

8. The method of any of paragraphs 1-7, wherein dipole wave processing of the first waveform acquisition is applied to constrain the identification of the slowness picks.

9. The method of any of paragraphs 1-8, wherein the dipole wave processing of the first waveform acquisition is applied to constrain a monopole wave processing of a second waveform acquisition; and the second waveform acquisition is acquired at a different time or borehole depth than the first waveform acquisition.

10. The method of any of paragraphs 1-9, wherein the mud wave slowness is determined by averaging mud wave slownesses over a borehole target zone.

11. The method of any of paragraphs 1-10, wherein the acoustic waveforms are acquired using an acoustic logging tool positioned along a wireline or drilling assembly.

12. An acoustic logging system, comprising an acoustic logging tool communicably coupled to a processor; and a memory coupled to the processor having instructions stored therein, which when executed by the processor, cause the processor to perform operations comprising acquiring acoustic waveforms of a borehole extending along a formation; determining a formation type of the formation using the acquired waveforms; identifying slowness picks using the formation type; and determining a characteristic of the formation using the slowness picks.

13. The system of paragraph 12, wherein mud wave slowness is used to determine the formation type.

14. The system of paragraphs 12 or 13, wherein determining the formation type comprises determining slowness asymptotes of the acquired waveforms; extracting Scholte wave slowness from the slowness asymptotes; calculating mud wave slowness using the Scholte wave slowness; and comparing the mud wave slowness and shear wave slowness to determine the formation type.

15. The system of any of paragraphs 12-14, wherein determining the slowness asymptotes comprises calculating a dispersion response of the acquired waveforms; determining full-frequency dispersion estimates by minimizing a misfit between theoretical dispersion curves and measured dispersion curves; and determining the slowness asymptotes from the full-frequency dispersion estimates.

16. The system of any of paragraphs 12-15, wherein identifying the slowness picks comprises determining a searching range of the shear wave slowness using the mud wave slowness, compressional wave travel time, and compressional wave slowness; determining a travel time of the shear wave slowness using the mud wave slowness and the compressional wave travel time; generating a semblance map using the searching range and travel time; and identifying the slowness picks of the semblance map.

17. The system of any of paragraphs 12-16, wherein the determination of formation type is performed in real-time.

18. The system of any of paragraphs 12-17, wherein monopole wave processing of a first waveform acquisition is applied to constrain the determination of the formation type.

19. The system of any of paragraphs 12-18, wherein dipole wave processing of the first waveform acquisition is applied to constrain the identification of the slowness picks.

20. The system of any of paragraphs 12-19, wherein the dipole wave processing of the first waveform acquisition is applied to constrain a monopole wave processing of a second waveform acquisition; and the second waveform acquisition is acquired at a different time or borehole depth than the first waveform acquisition.

21. The system of any of paragraphs 12-20, wherein the mud wave slowness is determined by averaging mud wave slownesses over a borehole target zone.

22. The system of any of paragraphs 12-21, wherein the acoustic waveforms are acquired using an acoustic logging tool positioned along a wireline or drilling assembly.

Moreover, the foregoing paragraphs and other methods described herein may be embodied within a system comprising processing circuitry to implement any of the methods, or a in a non-transitory computer-readable medium comprising instructions which, when executed by at least one processor, causes the processor to perform any of the methods described herein.

Although various embodiments and methods have been shown and described, the disclosure is not limited to such embodiments and methodologies and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A downhole acoustic logging method, comprising:
    acquiring acoustic waveforms of a borehole extending along a formation;
    determining whether a formation type of the formation is hard or soft using the acquired waveforms, wherein a hard formation has a formation shear slowness lower than a mud wave slowness and a soft formation has a formation shear slowness higher than the mud wave slowness;
    identifying slowness picks using the formation type; and
    determining a characteristic of the formation using the slowness picks.

2. The method of claim 1, wherein determining the formation type comprises:
    determining slowness asymptotes of the acquired waveforms;
    extracting Scholte wave slowness from the slowness asymptotes;
    calculating mud wave slowness using the Scholte wave slowness; and
    comparing the mud wave slowness and shear wave slowness to determine the formation type.

3. The method of claim 2, wherein determining the slowness asymptotes comprises:
    calculating a dispersion response of the acquired waveforms;
    determining full-frequency dispersion estimates by minimizing a misfit between theoretical dispersion curves and measured dispersion curves; and
    determining the slowness asymptotes from the full-frequency dispersion estimates.

4. The method of claim 2, wherein identifying the slowness picks comprises:
    determining a searching range of the shear wave slowness using the mud wave slowness, compressional wave travel time, and compressional wave slowness;
    determining a travel time of the shear wave slowness using the mud wave slowness and the compressional wave travel time;
    generating a semblance map using the searching range and travel time; and
    identifying the slowness picks of the semblance map.

5. The method of claim 1, wherein:
    the determination of formation type is performed in real-time; or monopole wave processing of a first waveform acquisition is applied to constrain the determination of the formation type.

6. The method of claim 5, wherein dipole wave processing of the first waveform acquisition is applied to constrain the identification of the slowness picks.

7. The method of claim 6, wherein:
the dipole wave processing of the first waveform acquisition is applied to constrain a monopole wave processing of a second waveform acquisition; and
the second waveform acquisition is acquired at a different time or borehole depth than the first waveform acquisition.

8. The method of claim 1, wherein the mud wave slowness is determined by averaging mud wave slownesses over a borehole target zone.

9. An acoustic logging system, comprising:
an acoustic logging tool communicably coupled to a processor; and
a memory coupled to the processor having instructions stored therein, which when executed by the processor, cause the processor to perform operations comprising:
acquiring acoustic waveforms of a borehole extending along a formation;
determining whether a formation type of the formation is hard or soft using the acquired waveforms, wherein a hard formation has a formation shear slowness lower than a mud wave slowness and a soft formation has a formation shear slowness higher than the mud wave slowness;
identifying slowness picks using the formation type; and
determining a characteristic of the formation using the slowness picks.

10. The system of claim 9, wherein determining the formation type comprises:
determining slowness asymptotes of the acquired waveforms;
extracting Scholte wave slowness from the slowness asymptotes;
calculating mud wave slowness using the Scholte wave slowness; and
comparing the mud wave slowness and shear wave slowness to determine the formation type.

11. The system of claim 10, wherein determining the slowness asymptotes comprises:
calculating a dispersion response of the acquired waveforms;
determining full-frequency dispersion estimates by minimizing a misfit between theoretical dispersion curves and measured dispersion curves; and
determining the slowness asymptotes from the full-frequency dispersion estimates.

12. The system of claim 10, wherein identifying the slowness picks comprises:
determining a searching range of the shear wave slowness using the mud wave slowness, compressional wave travel time, and compressional wave slowness;
determining a travel time of the shear wave slowness using the mud wave slowness and the compressional wave travel time;
generating a semblance map using the searching range and travel time; and
identifying the slowness picks of the semblance map.

13. The system of claim 9, wherein:
the determination of formation type is performed in real-time; or
monopole wave processing of a first waveform acquisition is applied to constrain the determination of the formation type.

14. The system of claim 13, wherein dipole wave processing of the first waveform acquisition is applied to constrain the identification of the slowness picks.

15. The system of claim 14, wherein:
the dipole wave processing of the first waveform acquisition is applied to constrain a monopole wave processing of a second waveform acquisition; and
the second waveform acquisition is acquired at a different time or borehole depth than the first waveform acquisition.

16. The system of claim 9, wherein the mud wave slowness is determined by averaging mud wave slownesses over a borehole target zone.

17. The system of claim 9, wherein the acoustic waveforms are acquired using an acoustic logging tool positioned along a wireline or drilling assembly.

18. A non-transitory computer-readable medium comprising instructions which, when executed by at least one processor, causes the processor to perform the method of claim 1.

* * * * *